3,336,344
2,5-DI-CARBALKOXY-AMINO-3,6-DIAMINO-1,4-BENZOQUINONES
Erhardt Winkelmann and Wolf-Helmut Wagner, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 30, 1963, Ser. No. 298,579
Claims priority, application Germany, Aug. 9, 1962, F 37,558
5 Claims. (Cl. 260—396)

The present invention relates to 2,5-di-carbalkoxy-amino-3,6-diamino-1,4-benzoquinones and to a process for their manufacture. The invention further relates to animal food or preparations containing the above-mentioned quinones as active substances against coccidiosis and to a process for the treatment of coccidiosis by applying said quinones.

It has been found that 2,5-di-carbalkoxyamino-3,6-diamino-1,4-benzoquinones of the general formula

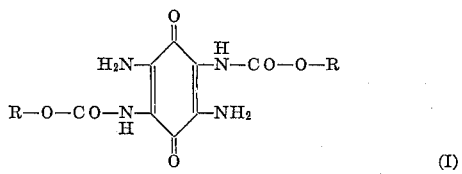

(I)

wherein R represnts an alkyl radical having from 1 to 4 carbon atoms, can be prepared by causing chloroformic acid alkyl esters of the formula

wherein R has the meaning given above, to act on 2,3,5,6-tetramino-1,4-benzoquinone.

The 2,3,5,6-tetramino-1,4-benzoquinone used as starting component for the process of the present invention can be prepared by the reaction of chloranil with potassium phthalimide and subsequent hydrazinolysis of the 2,3,5,6-tetraphthalimido-1,4-benzoquinone.

In the chloroformic acid alkyl ester of the above-mentioned Formula II the substituent R may represent, for instance, a methyl, ethyl, propyl, isopropyl, butyl or isobutyl radical.

The process of the invention is suitably carried out by suspending the 2,3,5,6-tetramino-1,4-benzoquinone in an appropriate anhydrous liquid serving as diluent or solvent, advantageously N-alkylated amides of lower carboxylic acids having from 1–2 carbon atoms such as N,N-dimethyl-formamide, N,N - diethyl-formamide, N,N-dimethyl-acetamide, N,N - diethyl-acetamide, N - methyl-formamide, N-ethyl-formamide, N-methyl-acetamide and N-ethyl-acetamide and slowly, e.g. dropwise adding the chloroformic acid alkyl ester at a temperature of 0 to 30° C. while stirring. In the reaction 2 mols of chloroformic acid alkyl ester can be used for 1 mol of 2,3,5,6-tetramino-1,4-benzoquinone; it is, however, advantageous to apply the first component in an excess which may amount to 100% if low-boiling chloroformic acid alkyl esters are used. After the decay of the reaction, it is of advantage to continue stirring for several hours at an elevated temperature, preferably near the boiling temperature of the solvent or diluent, e.g. at 90–100° C.

Since the halogen atom is split off as hydrogen halide in the course of the reaction, it is appropriate to add a suitable acid acceptor in order to bind the acid. For this purpose there may be used tertiary amines such, for example, as trimethylamine, triethylamine, dimethylaniline, or alkali metal carbonates or alkaline earth metal carbonates such as sodium carbonate, sodium bicarbonate, potassium carbonate and calcium carbonate. It is of special advantage to carry out the reaction in a distributing agent which like the pyridine, for example, serves simultaneously as acid acceptor. Other organic nitrogen bases may likewise be used, for example, α-, β- and γ-picoline, lutidine, collidine, quinoline, isoquinoline and quinaldine. It is advantageous to apply such a solvent in 10 to 20 times the weight of the benzoquinones.

The reaction temperature may range from room temperature to 120° C.; it is preferable to operate at 90–100° C. (steam bath). The reaction periods vary between one and several hours according to the chloroformic acid alkyl ester used and the other conditions applied in each case.

In general, the products obtained according to the process of the invention crystallize out in crystalline form or as a powder, immediately or on cooling the reaction mixture and can be isolated in the usual manner by suction-filtering. After filtering with suction, the reaction mixture is treated with water; or the reaction mixture is preferably mixed with about the same volume of water before being suction-filtered, and the reaction product is then suction-filtered. The products obtained can, if desired, be purified by recrystallization from an appropriate solvent, such, for example, as nitrobenzene.

The new products of the invention are valuable medicaments. They are particularly suitable for the prophylaxis and therapy of poultry coccidiosis. The products of the invention, even when administered in small doses, cure a fully developed coccidiosis or prevent infections at all when being use dfor the prophylaxis.

The following test demonstrates the excellent therapeutical efficiency of the 2,5-di-carbomethoxyamino-3,6-diamino-1,4-benzoquinone prepared according to the present invention in the treatment of chickens suffering from coccidiosis. One or a few days old chickens (white leghorn) were infected with a fixed quantity of spored oocysts of Eimeria tenella by means of the esophageal sound. 10 animals each were treated in one group. The therapeutical treatment was started one day after the infection and continued until the 9th day (once on successive days). 5 milligrams each of 2,5-di-carbomethoxy-amino-3,6-diamino-1,4-benzoquinone per kg. of live weight of the animal were dissolved or suspended in a suitable medium and given as single dose by means of the esophageal sound. The number of the surviving animals, the increase in weight and the content of oocysts in the cecum detected in the autopsy at the end of the test, served as criteria for the good results of the treatment.

The described therapeutical test showed the following results: All animals which had been treated with the compound prepared according to the process of the present invention survived. At the end of the test no oocysts were detected in the cecum. In spite of the infection, an average increase in weight of 70 grams per chicken could be observed. The non-treated chickens, which had been infected for control purposes, died without exception.

For the prophylactic treatment of the poultry coccidiosis the products of the present invention likewise exhibit an excellent efficiency as can be seen from the feeding test described in the following:

Animal food consisting of

| | Kg. |
|---|---|
| White-fish meal | 3.5 |
| Soya meal | 9.0 |
| Barley coarse meal | 2.5 |
| Maize coarse meal | 20.75 |
| Wheat coarse meal | 10.00 |
| Wheat bran | 2.5 |
| Calcium phosphate | 0.5 |
| Calcium carbonate | 0.5 |
| A mixture of vitamins and mineral salts | 0.75 | was mixed with such a quantity of 2,5-di-carbomethoxy-amino-3,6-diamino-1,4-benzoquinone that the content of active substance in the food mixture was 0.006 or 0.0125%. The chickens in groups of 10 animals each were given this food during the test period, starting several days before the infection which was carried out as described above.

The infection dose was 120,000 oocysts per chicken. For determining the success of the treatment the above-mentioned criteria enter into consideration. The following table shows the results of the test.

|  | Prophylactically treated animals— concentration of I in the food | | Infected, non-treated control animals | Non-infected control animals |
| --- | --- | --- | --- | --- |
|  | 0.006% | 0.0125% | | |
| Mortality/totally | 0/10 | 0/10 | 10/10 | 0/10 |
| Average increase in weight in percent | +221 | +192 | | +181 |

I=2,5-di-carbomethoxyamino-3,6-diamino-1,4-benzoquinone.

After the infection the animals treated prophylactically with 2,5 - di - carbomethoxyamino-3,6-diamino-1,4-benzoquinone survived without exception. The autopsy carried through on the fourteenth day after the beginning of the test showed that practically no oocysts were found in the cecum.

The pharmacological tests described above show that the compounds prepared according to the process of the present invention are particularly suitable for the therapy and prophylaxis of poultry coccidiosis.

The products of the invention are administered per os. For this purpose, it is suitable to extend the substances advantageously with a solid, inert and well tolerable mass in which they are homogeneously distributed, most favorably by means of an appropriate mixing device. The active substances are preferably admixed with the food with which they are then taken up by the animals. In order to attain a satisfying and uniform distribution it is useful to prepare at first a preliminary mixture in which the active substances are highly concentrated. In practice, concentrations of 10 to 50%, preferably of about 25%, enter into consideration. Inorganic or organic substances may be used as carriers. There may be used, for example, calcium carbonate, flour of various types of grain or dry mycelium of the fermentation of antibiotics. It is of advantage to use wheat middlings for the purpose in question. Other substances important in animal nutrition, for instance antibiotics or vitamins, may be added to the preliminary mixtures. A corresponding amount of such a preliminary mixture is then thoroughly mixed with the chicken- or hen food so that a uniform distribution in the desired concentration is ensured. The following example serves to illustrate the invention, but it is not intended to limit it thereto:

*Example—2,5-di-carbomethoxyamino-3,6-diamino-1,4-benzoquinone*

16.8 grams (0.1 mol) of finely powdered 2,3,5,6-tetramino-1,4-benzoquinone are suspended in 250 cc. of dry pyridine, and while stirring and cooling with ice 37.8 grams (0.4 mol) of chloroformic acid methyl ester are added dropwise. The reaction mixture is then heated for 5 hours on the steam bath while stirring. After cooling, the mixture is mixed with about the same volume of water, filtered with suction, washed with water and acetone and dried on the steam bath.

23.5 grams (83 percent of the theory) of 2,5-di-carbomethoxyamino - 3,6 - diamino-1,4-benzoquinone are obtained in the form of a dark brown powder. The compound does not show a characteristic melting point.

$C_{10}H_{12}N_4O_6$ (molecular weight 284): Calculated: C, 42.2%; H, 4.2%; N, 19.7%. Found: C, 42.2%; H, 4.1%; N, 19.7%.

The following 2,5-di-carbalkoxy-amino-3,6-diamino-1,4-benzoquinones can be prepared in the same way:

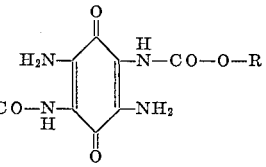

| Substituent R | Excess of X—CO—O—R used, percent | Reaction period on the steam bath in hours | Yield in percent of the theory | Color |
| --- | --- | --- | --- | --- |
| Ethyl | 10 | 3 | 80 | Red-brown crystals. |
| Isopropyl | 10 | 3 | 72 | Bright-ocherous powder. |
| Isobutyl | 10 | 3 | 76 | Dark brown crystals. |

The elementary analysis shows the following values for the aforementioned substances:

| Substituent | Summary formula | Molecular weight | Nitrogen | |
| --- | --- | --- | --- | --- |
|  |  |  | Calculated, percent | Found, percent |
| Ethyl | $C_{12}H_{16}N_4O_6$ | 312 | N, 18.0<br>C, 46.2<br>H, 5.1 | N, 18.5<br>C, 45.8<br>H, 5.1 |
| Isopropyl | $C_{14}H_{20}N_4O_6$ | 340 | N, 16.5<br>C, 49.4<br>H, 5.9 | N, 16.7<br>C, 48.9<br>H, 6.1 |
| Isobutyl | $C_{16}H_{24}N_4O_6$ | 368 | N, 15.2<br>C, 52.2<br>H, 6.5 | N, 15.6<br>C, 52.8<br>H, 6.5 |

We claim:
1. A compound of the formula

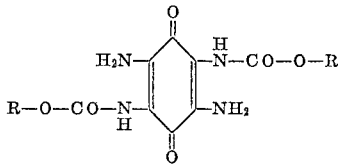

in which R represents an alkyl of 1 to 4 carbon atoms.
2. 2,5 - di - carbomethoxyamino-3,6-diamino-1,4-benzoquinone.
3. 2,5 - di - carbo-ethoxyamino-3,6-diamino-1,4-benzoquinone.
4. 2,5 - di - carbo-isopropyloxy-amino-3,6-diamino-1,4-benzoquinone.
5. 2,5 - di - carbo-isobutyloxy-amino-3,6-diamino-1,4-benzoquinone.

References Cited

UNITED STATES PATENTS

| 2,715,636 | 8/1955 | Carson | 260—396 |
| 2,727,904 | 12/1955 | Ochwat | 260—396 |
| 2,958,600 | 11/1960 | Thurman | 99—2 |
| 2,965,488 | 12/1960 | Belasco | 99—2 |
| 3,065,133 | 11/1962 | Tchelitcheff | 167—53.1 |
| 3,085,937 | 4/1963 | Hirayama | 167—53.1 |

OTHER REFERENCES

Wagner and Zook: Synthetic Organic Chemistry, 1953, John Wiley & Sons, Inc., page 646.

LORRAINE A. WEINBERGER, *Primary Examiner.*

LEON ZITVER, *Examiner.*

D. P. CLARKE, L. A. THAXTON, *Assistant Examiners.*